(12) United States Patent
Guo et al.

(10) Patent No.: US 10,839,452 B1
(45) Date of Patent: Nov. 17, 2020

(54) COMPRESSED NETWORK FOR PRODUCT RECOGNITION

(71) Applicant: Shenzhen Malong Technologies Co., Ltd., Shenzhen (CN)

(72) Inventors: Sheng Guo, Shenzhen (CN); Haozhi Zhang, Shenzhen (CN); Weilin Huang, Shenzhen (CN); Tiangang Zhang, Shenzhen (CN); Yu Gao, Shenzhen (CN); Le Yin, Shenzhen (CN); Matthew Robert Scott, Shenzhen (CN)

( * ) Notice: Subject to any disclaimer, the term of this patent is extended or adjusted under 35 U.S.C. 154(b) by 0 days.

(21) Appl. No.: 16/455,294

(22) Filed: Jun. 27, 2019

Related U.S. Application Data

(63) Continuation of application No. PCT/CN2019/086367, filed on May 10, 2019.

(51) Int. Cl.
  *G06Q 30/06* (2012.01)
  *G06N 20/00* (2019.01)
  (Continued)

(52) U.S. Cl.
  CPC ......... *G06Q 30/0643* (2013.01); *G06F 17/15* (2013.01); *G06F 17/16* (2013.01);
  (Continued)

(58) Field of Classification Search
  CPC ....... G02B 2027/0138; G06K 9/00288; G06K 9/00536; G06K 9/00671; G06K 9/46; G06K 9/6267; G06K 2209/17; G06Q 30/0268; G06Q 30/0601; G06Q 30/0641; G06Q 30/0643; G06Q 20/20; G06N 3/02; G06N 3/04; G06N 3/0454; G06N 3/08; G06N 20/00; G06F 17/15; G06F 17/16
  See application file for complete search history.

(56) References Cited

U.S. PATENT DOCUMENTS

| | | | |
|---|---|---|---|
| 2015/0054959 A1* | 2/2015 | He | G06K 9/62 |
| | | | 348/150 |
| 2018/0260665 A1* | 9/2018 | Zhang | G06K 9/6215 |
| 2019/0294929 A1* | 9/2019 | Yao | G06N 3/084 |

FOREIGN PATENT DOCUMENTS

WO   WO-2019013711 A1 *  1/2019  ........... G06Q 20/208

OTHER PUBLICATIONS

Hu et al., Network Trimming: A Data-Driven Neuron Pruning Approach towards Efficient Deep Architectures, pp. 1-9, Jul. 2016. (Year : 2016).*

(Continued)

*Primary Examiner* — Kamran Afshar
*Assistant Examiner* — Marshall L Werner
(74) *Attorney, Agent, or Firm* — Shook, Hardy & Bacon L.L.P.; Charlie Zhao

(57) ABSTRACT

Aspects of this disclosure include technologies to detect unpackaged, unlabeled, or mislabeled products based on product images. Leveraging from improved machine learning techniques, the disclosed technical solution can reduce a full product space for product search to a partial product space. Accordingly, a limited number of product candidates in the partial product space may be visually presented for user evaluation. Sometimes, a product candidate is to be comparatively presented with a live image of the product via a uniquely designed graphic user interface, which further improves the confidence of the user and the accuracy of the underlying transaction.

20 Claims, 9 Drawing Sheets

(51) Int. Cl.
  *G06F 17/15* (2006.01)
  *G06N 3/04* (2006.01)
  *G06F 17/16* (2006.01)
  *G06K 9/00* (2006.01)

(52) U.S. Cl.
  CPC .......... *G06K 9/00671* (2013.01); *G06N 3/04* (2013.01); *G06N 20/00* (2019.01)

(56) References Cited

OTHER PUBLICATIONS

Han et al., Learning both Weights and Connections for Efficient Neural Networks, pp. 1-9, Oct. 2015. (Year: 2015).*
Chen et al., SCA-CNN: Spatial and Channel-wise Attention in Convolutional Networks for Image Captioning, 2017 IEEE Conference on Computer Vision and Pattern Recognition, pp. 6298-6306, 2017. (Year: 2017).*
Hu et al., Squeeze-and-Excitation Networks, pp. 1-14, Oct. 2018. (Year: 2018).*
Chen et al., Multi Attention Module for Visual Tracking, Pattern Recognition 87, pp. 80-93, Oct. 2018. (Year: 2018).*
He et al., Channel Pruning for Accelerating Very Deep Neural Networks, pp. 1-10, Aug. 2017. (Year: 2017).*
Hu et al., A Novel Channel Pruning Method for Deep Neural Network Compression, pp. 1-10, May 2018. (Year: 2018).*

\* cited by examiner

COMPRESSED NETWORK FOR PRODUCT RECOGNITION

CROSS-REFERENCE TO RELATED APPLICATION

This application is a continuation of International Application No. PCT/CN2019/086367, filed May 10, 2019.

BACKGROUND

Barcodes, affixed to many commercial products in the modern economy, have made automated checkout and inventory tracking possible in many retail sectors. However, labeling each product could be expensive, impractical, or error-prone in many occasions, such as for produce sold in greengrocers, farmers' markets, or supermarkets.

For unlabeled products, conventional systems may try to alphabetically or categorically enumerate every possible product in stock to assist users in selecting a correct product, which is like looking for a needle in a haystack sometimes. Browsing and comparing a long list of products require intense attention, which may lead to user frustration and errors. Further, conventional systems are prone to fraud. For example, scammers may intentionally switch barcode labels to pay less to merchants.

Computer vision and machine learning potentially could provide a promising future for recognizing unlabeled or unpackaged products. However, solutions based on computer vision and machine learning generally require significant computational capabilities, such as graphical processing units (GPUs) and massive computer memory. Typically, such resource intensive solutions cannot be readily applied in mobile computing or edge computing, such as with mobile devices or point of sale (POS) terminals with limited storage and computational power.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In various aspects, systems, methods, and computer-readable storage devices are provided to improve a computing device's ability to detect unpackaged, unlabeled, or mislabeled products. In general, aspects of this disclosure include a technical solution to recognize products based on product images instead of machine readable labels, such as barcodes. For an unpackaged, unlabeled, or mislabeled product, the disclosed technical solution is to reduce a full product space to a partial product space, e.g., based on machine learning techniques. Accordingly, a limited number of product candidates in the partial product space may be visually presented for user selection or confirmation. Further, a graphic user interface (GUI) is provided to enable a highly ranked product candidate and an image (or live image) of the product to be presented comparatively. This uniquely designed GUI can further improve the confidence of user selection and the accuracy of the underlying transaction.

One aspect of the technology described herein is to improve a computing device's ability to detect products with mobile computing or edge computing based on a compressed neural network, such that even POS terminals with limited storage and computational power can run sophisticated neural networks locally for product recognition. Another aspect of the technology described herein is to compress a neural network based on channel reduction. Resultantly, the compressed network will have less channels than the uncompressed network, at least for a layer, which leads to reduced space complexity and time complexity. Yet another aspect of the technology described herein is to identify dispensable channels based on attention, which may focus on channel-wise correlation or spatial-wise correlation in some embodiments.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
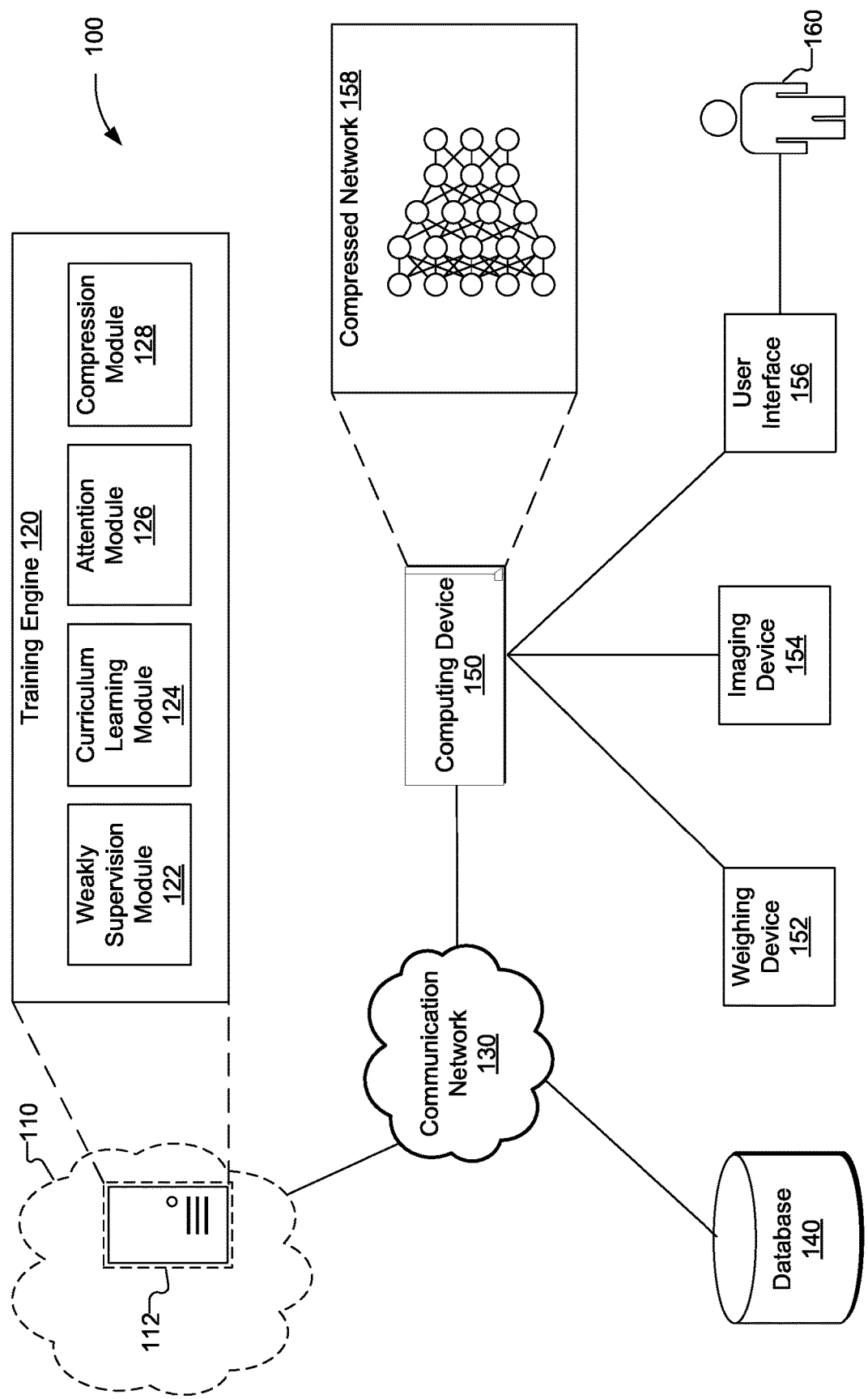
FIG. 1 is a block diagram illustrating an exemplary operating environment for product recognition, in accordance with at least one aspect of the technology described herein.

The various technologies described herein are set forth with sufficient specificity to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Further, the term "based on" generally means in view of, or using, those recited items as criteria or factors, possibly among other criteria or factors, when performing an action. The term "based on" should not be interpreted as implying an exclusive condition.

For unlabeled products, conventional systems usually try to alphabetically or categorically enumerate every possible product in stock to assist users to select a correct product. Typically, all potential products are represented in a list, and some products may have accompanying images. When the product collection is large, a user may have to flip through many pages of the listings. User experience is like looking for a needle in a haystack in such cases. Such conventional systems could be inefficient and frustrating.

An improved conventional system may enable users to browse products in a hierarchical fashion, such as based on categories and subcategories. A further improved conventional system may enable users to conduct keyword search. However, these types of conventional systems heavily depend on the users, which leads to confusions to a novice, such as when the novice is unfamiliar with the product hierarchy or lacks idea of relevant keywords.

Conventional systems are also subject to human error. Comparing product information or images of voluminous products requires prolonged user attention, which may lead to user frustration and potential human errors, such as selecting wrong items. Further, conventional systems are prone to fraud. For example, scammers may intentionally switch barcode labels or intentionally select different items to pay less to merchants.

The inefficiency, unfriendliness, and vulnerability of conventional systems are at least partially associated with choice overload in which users are challenged to make a right decision in limited time when faced with too many options.

In contrast, this disclosure provides an efficient, friendly, and robust technical solution to detect and recognize unpackaged, unlabeled, or mislabeled products, and assist users to make the right decision without choice overload. At a high level, the disclosed technical solution is to detect and recognize unlabeled products from an image of the target product, e.g., based on machine learning techniques. For users, the unlabeled product recognition process will help them reduce a conventional full product space with all potential products to a new partial product space with only a few product candidates that would highly likely match the target product. Further, the few highly ranked product candidates in the partial product space will be comparatively presented with the target product in a novel GUI for user confirmation. In this way, instead of browsing through pages of listings, the user can simply confirm one of the finalists in the partial product space, e.g., by visually comparing a finalist with the actual target product on hand. Advantageously, the disclosed technical solution not only supports more efficient and accurate transactions, but further improves the user experience of a full spectrum of customers, from novice to experienced customers.

Specifically, one aspect of the technology described herein is to improve a computing device's functions to detect unlabeled products based on a compressed neural network, such that even POS terminals or a mobile device can run sophisticated neural networks locally for product recognition. Among other methods, this disclosure also provides an effective way to compress neural networks, specifically, based on channel reduction. The compressed network will have less channels than the uncompressed network, at least in terms of a layer, which leads to reduced space complexity and time complexity. Accordingly, this disclosure brings unlabeled product recognition technologies to mobile computing and edge computing. In other words, traditional light computing devices with limited storage and computational power now can perform new functions to recognize unlabeled products.

In some practical applications, the disclosed technology is used in retail. By way of example, a system in a store, by using the disclosed technology, can recognize unlabeled products and thus facilitate sales to customers. In some practical applications, the disclosed technology is used in informatics. A system equipped with the disclosed technology can retrieve and present information related to an object. By way of example, a system in an exhibition or a trade show, by using the disclosed technology, can recognize unlabeled products and further retrieve or present relevant information of the product, such as the manufacture, the brand, the model, the price, etc. The relevant information may be presented through GUI, sound, video, tactile input/output, etc. via a user device or a display near the user. In other practical applications, the disclosed technology can be used for many other types of fields or user cases.

Having briefly described an overview of aspects of the technology described herein, an exemplary operating environment in which aspects of the technology described herein may be implemented is described below. Referring to the figures in general and initially to FIG. 1 in particular, an exemplary operating environment for implementing unlabeled product recognition is shown. This operating environment is merely one example of a suitable computing environment and is not intended to suggest any limitation as to the scope of use or functionality of aspects of the technology described herein. Neither should this operating environment be interpreted as having any dependency or requirement relating to any one component nor any combination of components illustrated.

Turning now to FIG. 1, a block diagram is provided showing an operating environment in which some aspects of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by an entity may be carried out by hardware, firmware, and/or software. For instance, some functions may be carried out by a processor executing instructions stored in memory.

In addition to other components not shown in FIG. 1, this operating environment includes system 100 for recognizing unlabeled products and facilitating transactions on the recognized products. Among other components not shown, system 100 includes computing device 112 on computing cloud 110, computing device 150, and database 140, communicatively coupled via communication network 130. Computing device 150 may incorporate or utilize weighing device 152 and imaging device 154 as input devices, and interact with user 160 via user interface 156.

In various embodiments, computing device 112 includes training engine 120. Training engine 120 is generally configured for constructing and training a compressed neural network, e.g., using images in database 140. In some embodiments, training engine 120 is to train a compressed neural network to recognize unlabeled products based on images. Compressed network 158 is one of trained compressed neural networks that has been deployed to computing device 150. Compressed network 158 is configured to determine the features of an image, classify the image into one or more image classes based on the determined features, or rank a list of classes based on the determined features. Accordingly, compressed network 158 can be used to determine the similarity between an unlabeled product and a known product based on their respective features.

Different from conventional methods, the various embodiments herein are directed towards training the neural network using a combination of weakly-supervised training, curriculum learning, attention, and compression techniques for unlabeled product recognition, e.g., based on weakly-supervision module 122, curriculum learning module 124, attention module 126, and compression module 128 in training engine 120.

Weakly-supervision module 122 is configured to train a neural network with "noisy" data to construct predictive models by learning with weak supervision. Typical clean data comprises two parts: a feature vector characterizing the data and a label representing the ground-truth output. Noisy data refers to some data being unlabeled, some data only given coarse-grained labels, some data being mislabeled with anything but the ground-truth, or any combinations thereof. In system 100, weakly-supervision module 122 is configured to use such noisy data in learning with weak supervision, so that large and diverse training datasets can be used to construct more robust and accurate predictive models.

Curriculum learning module 124 is configured to train a neural network starting with easier tasks and gradually increasing the difficulty level of the tasks with complexity-ranked subsets of training data. Accordingly, curriculum learning module 124 may discover meaningful and underlying local structure of large-scale noisy data. In some embodiments, the training images from database 140 are ranked from easy (or clean) to difficult (or noisy) in a learned feature space in an unsupervised manner. Density-based (unsupervised) clustering may be employed to generate the complexity rankings of the training images and subsets of training images. The knowledge acquired during the training is cumulative, and the training starts with the "easiest" examples of training images and progresses towards the "more difficult" examples of training images. The training may be terminated after the neural network is provided the "most difficult" examples of training images, and the training converges to generate a high-performing predictive model. As such, the embodiments are applicable and scalable to large-scale datasets that include voluminous noisy training data.

Figure 4:
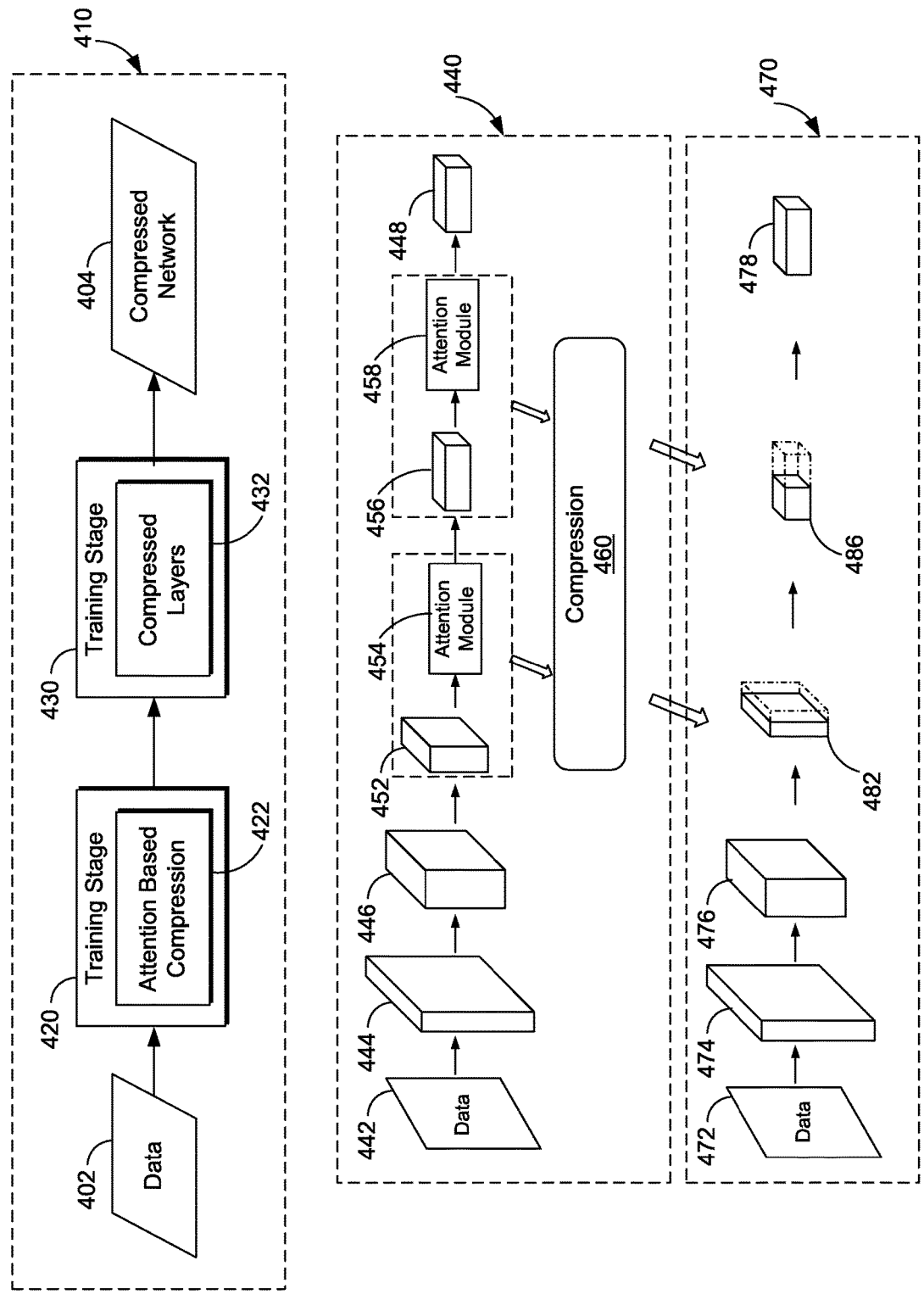
FIG. 4 is a schematic representation illustrating an exemplary training process, in accordance with at least one aspect of the technology described herein.
Figure 5:
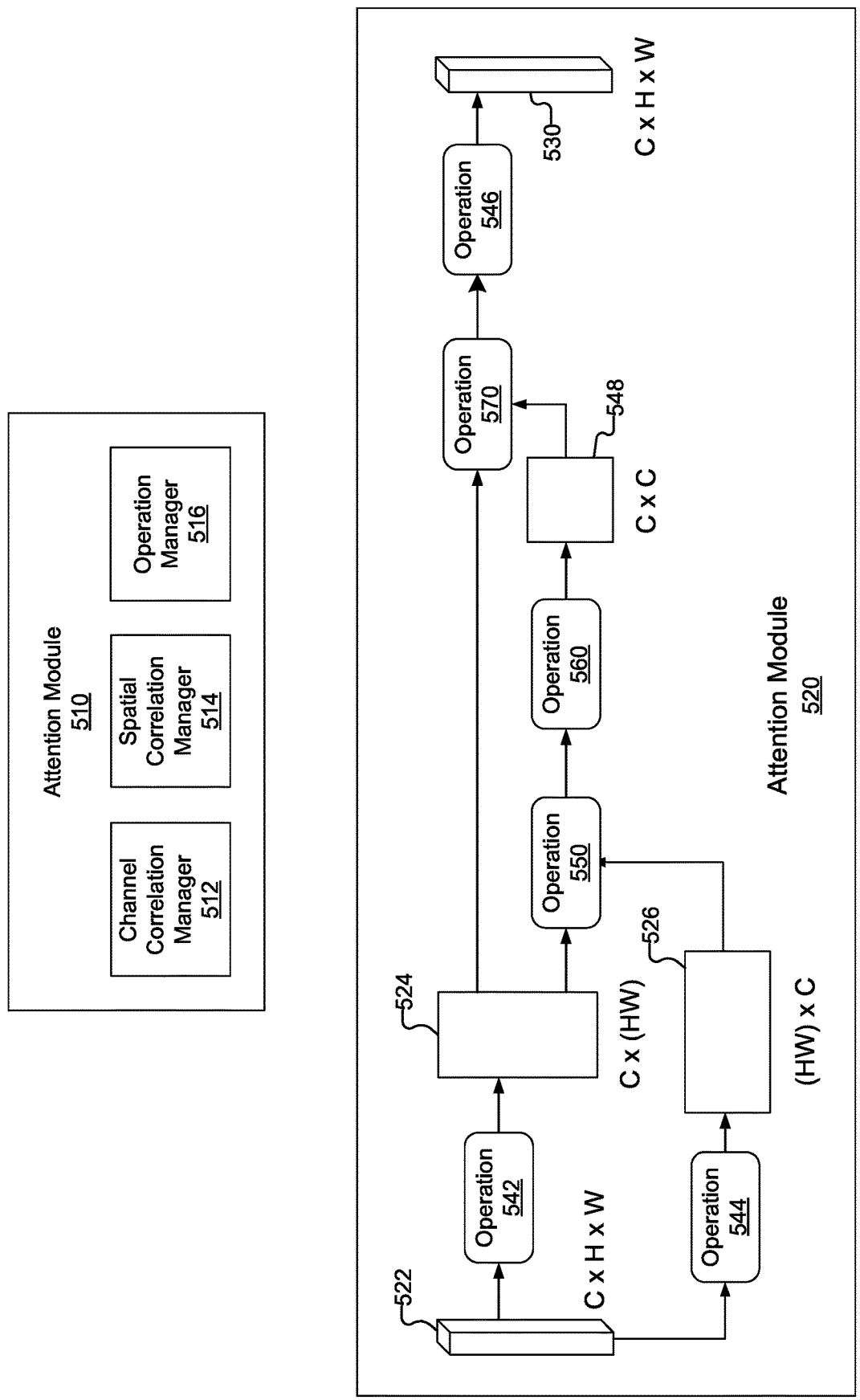
FIG. 5 is a schematic representation illustrating an exemplary attention process, in accordance with at least one aspect of the technology described herein.
Figure 6:
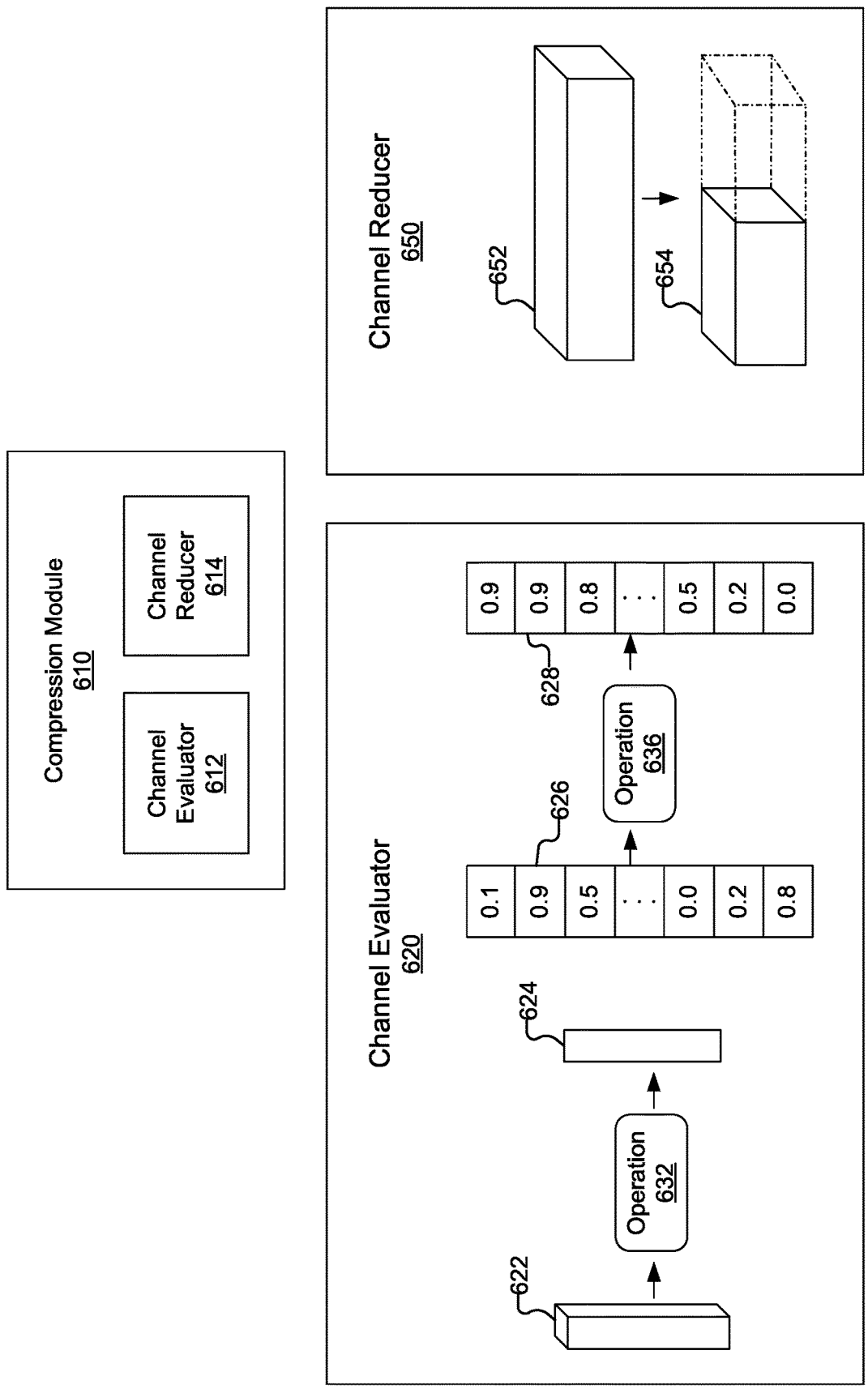
FIG. 6 is a schematic representation illustrating an exemplary compression process, in accordance with at least one aspect of the technology described herein.

Attention module 126 and compression module 128 are configured to work together for channel-reduction based compression of a neural network in some embodiments. As described in further detail in connection with FIGS. 4-6, attention module 126 is configured to reveal channels based on their respective differentiation power. In other words, attention module 126 can reveal channels that contain significant information in respect to the task on hand, such as shown in FIG. 5. In one embodiment, training engine 120 is to add an attention module after a convolution layer that needs to be compressed, such as shown in FIG. 4. The features of the attention module may then be used by a compression module to determine specific channels that contain significant information, such as shown in FIG. 6. Subsequently, compression module 128 can selectively trim away those channels that do not carry significant information. As a result, a compressed layer will have less channels after its compression.

A neural network with layers with fewer channels requires less computational resources to operate. Therefore, a compressed neural network, such as compressed network 158, may be deployed to computing devices with limited storage and computational power, such as computing device 150. Meanwhile, with compressed network 158, computing device 150 may now support real-time applications, such as to recognize unlabeled products in real-time.

Computing device 150 is operatively connected to weighing device 152 and imaging device 154. In some embodiments, weighing device 152 and imaging device 154 are incorporated as respective components of computing device 150. Weighing device 152 comprises a scale to measure weight or mass, e.g., a mechanical scale, digital scale, and the like. Imaging device 154 may include a camera that detects visual wavelengths, infrared (IR), ultraviolet (UV), and the like. Imaging device 154 may also include stereoscopic cameras, 3D cameras, and the like. In some embodiments, imaging device 154 may generate visual image data encoding a visual image, including, but not limited to, a target product on weighing device 152.

In one embodiment, computing device 150 is a checkout machine or a POS terminal device, which may be used in a store for check out transactions. In this case, imaging device 154 may be installed above weighing device 152. When user 160 places an unlabeled product on weighing device 152, user 160 may manually activate imaging device 154 to generate an image of the unlabeled product. In some embodiments, the weight change detected by weighing device 152 will automatically trigger imaging device 154 to generate an image of the unlabeled product. In some embodiments, computing device 150 is configured to monitor a designated area based on one or more sensors (e.g., motion sensors, proximity sensor, touch switches, image sensors, etc., although not shown in FIG. 1), and actuate imaging device 154 to generate an image when the unlabeled product is detected to be presented on the designated area.

Figure 2:
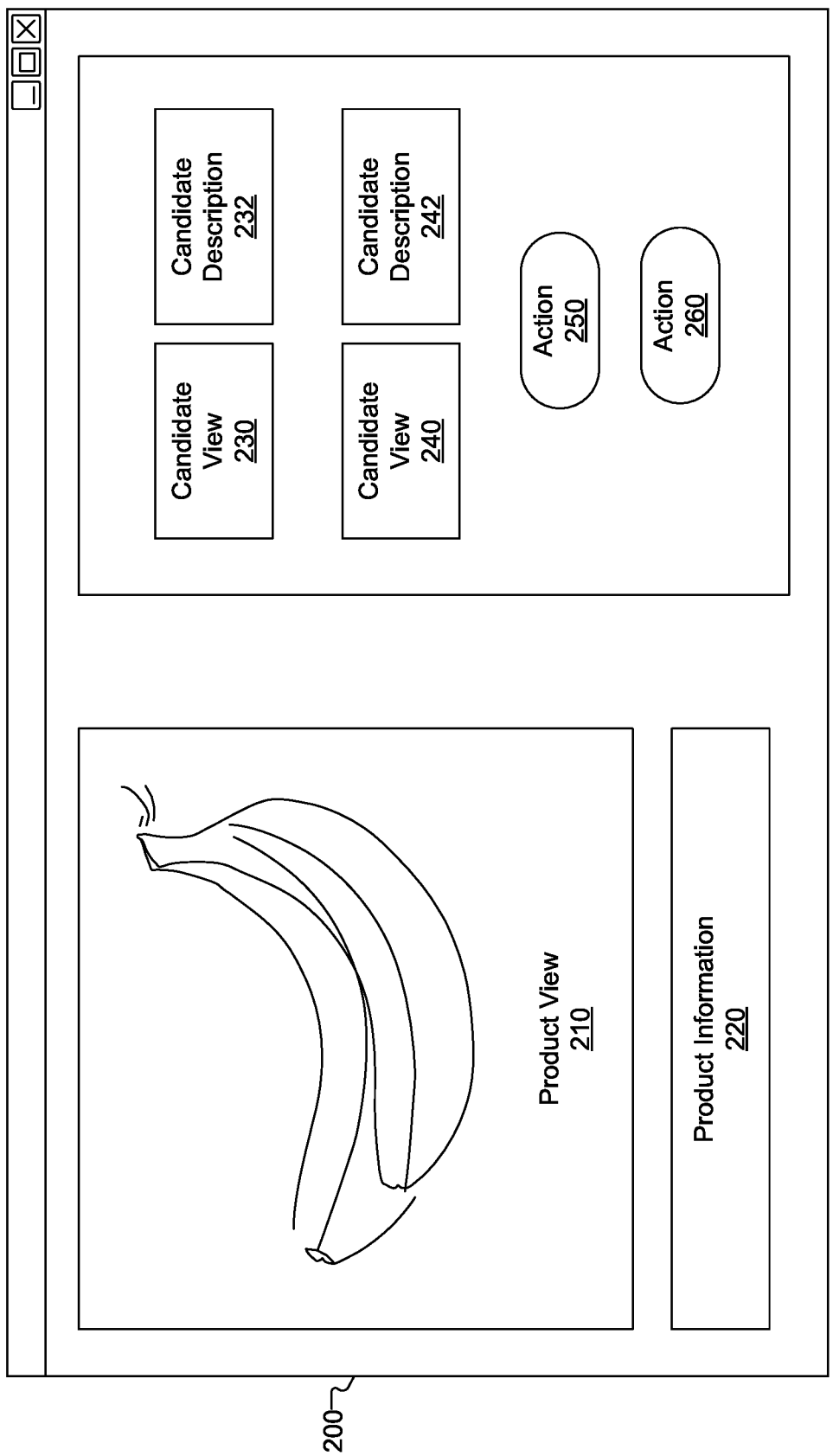
FIG. 2 is a schematic representation illustrating an exemplary GUI for product recognition, in accordance with at least one aspect of the technology described herein.
Figure 3:
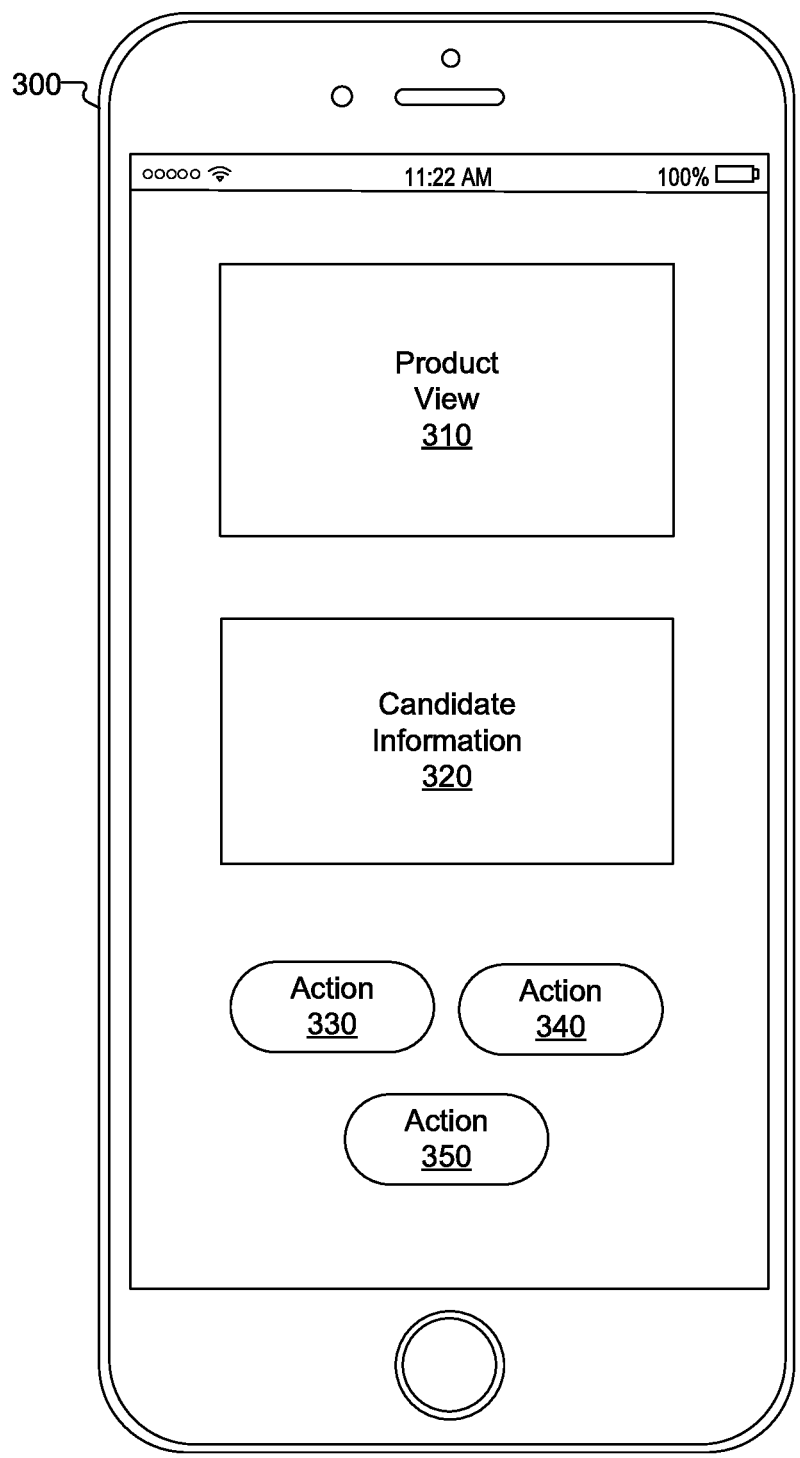
FIG. 3 is a schematic representation illustrating another exemplary GUI for product recognition, in accordance with at least one aspect of the technology described herein.

Computing device 150 may then use compressed network 158 to recognize the unlabeled product in the image, and select some highly ranked product candidates for user confirmation. Compressed network 158, trained via weakly-supervision module 122, curriculum learning module 124, attention module 126, and compression module 128, can generally achieve very high accuracy. It means that the highly ranked product candidates determined by compressed network 158 usually contain the actual target product. To obtain the user confirmation, one or more highly ranked product candidates may be displayed via user interface 156 to user 160, such as illustrated in FIGS. 2-3. In this solution, user 160 only needs to confirm one product from a handful of options compared to the onerous task of seeking a needle in a haystack as in some conventional systems. Therefore, user 160 will save time for the transaction. Further, the transaction is likely accurate with the correct product because selecting the correct product from a handful options is a relative easy task.

It should be understood that this operating environment shown in FIG. 1 is an example. Each of the system components shown in FIG. 1 may be implemented on any type of computing device, such as computing device 900 described in connection to FIG. 9, for example. Further, system 100 may communicate with various devices, or system components in system 100 may communicate with each other, via a network, which may include, without limitation, a local area network (LAN) and/or a wide area network (WAN). In exemplary implementations, WANs include the Internet and/or a cellular network, amongst any of a variety of possible public and/or private networks.

As can be contemplated by a person skilled in the art, different application-specific or domain-specific input/output devices or communication messages are likely required to solve application-specific or domain-specific problems. In various embodiments, different input/output devices may be added or removed from the exemplary operating environment depicted in FIG. 1, such as various sensors discussed above. Similarly, different users, e.g., system administrators and store managers, although not shown, may interact with system 100. Further, system 100 may communicate with other systems to accomplish other tasks.

Referring now to FIG. 2, a schematic representation is provided illustrating an exemplary GUI for product recognition, which is designated generally as GUI 200, in accordance with at least one aspect of the technology described herein. GUI 200 comprises two main areas for comparatively presenting the unlabeled product and one or more product candidates. By way of example, one area may be reserved to show the unlabeled product and its information, while the other area may be used to present the highly ranked candidates and their information. In this example, product view 210 and product information 220 are shown on the left area, while product candidates and their information are shown on the right area. The inventors have contemplated that the two main areas may be alternatively configured in an up-down setting, such as shown in FIG. 3. Further, the specific locations of various GUI components as illustrated are not intended to suggest any limitation as to the scope of design or functionality of these GUI components. As an example, switching the locations of the unlabeled product and the product candidate would not alter the design principle and the functionality of causing a comparative display of the unlabeled product and a product candidate, which can facilitate the user intuitively selecting the correct product.

Product view 210 comprises a view of the unlabeled product on hand. The view may be consistent with the image used for product recognition in some embodiments. In other embodiments, the view may be switched to a different view, such as a real-time view of the unlabeled product. Product information 220 may comprise information input by a user, or information detected by the system. As an example, product information 220 may comprise a GUI subcomponent (e.g., a keypad) to intake user input, such as the count of individual product. As another example, the count of individual product could be detected by the system, such as via object detection and counting techniques. As yet another example, product information 220 may comprise detected information, such as weight information of the unlabeled product, which may be detected, e.g., by weighing device 152.

One or more candidate views, corresponding to respective highly ranked product candidates, may be presented on GUI 200, such as candidate view 230 and candidate view 240. In one embodiment, the top ranked product candidates will be presented first. A compressed network, such as compressed network 158, may be trained to reduce a full product space to a partial product space. In general, the partial product space comprises only partial products of the full product space, by selecting the partial products based on a static or dynamic threshold. A highly ranked product candidate refers to the rank of the product candidate being above the threshold. By way of example, in some embodiments, the full product space may comprise all stock keeping units (SKUs) in a store or in a specific category of products, while the partial product space may only comprise partial SKUs in the store or in the specific category. As discussed previously, such reduction in product space can help users identify the correct product more effectively and efficiently.

As illustrated in FIG. 2, candidate view 230 and candidate view 240 may represent the two highly ranked product candidates, while candidate description 232 and candidate description 242 comprise corresponding product information, such as the attributes associated with the product candidate, including, but not limited to, unit price, manufacturer, description, material, size, color, promotion terms, warranty terms, etc. Although two candidate views are illustrated in FIG. 2, it should be understood that both static and dynamic threshold cutoffs may be adopted for different practical applications, which will be discussed in more detail in connection with FIG. 7. Accordingly, one, two, three, or any suitable number of product candidates may be presented together, depending on the specific application.

GUI 200 may be presented on a touchscreen to facilitate interaction for various actions. Action 250 and action 260 in GUI 200 are elements of interaction, which facilitate a user to directly interact with an application. Action 250 and action 260 may comprise one or more graphical elements for interaction, such as buttons, icons, selections, etc. An action event occurs whenever an action is performed by the user via action 250 or action 260, e.g., when the user presses or clicks a button, chooses an item, presses Enter in a text field, etc. As a result, a message of the action performed is sent to all action listeners that are registered on action 250 or action 260, so that a specific action may be executed.

In various embodiments, action 250 is a control element configured to browse the partial product space. Upon action 250 being activated, the system may present another set of candidate products on GUI 200. By way of example, under a "browsing" mode, action 250 may comprise a "next" button, upon being activated, the next set of candidate products from the partial product space may be retrieved and presented on GUI 200. By the same token, action 250 may comprise a "previous" button, upon being activated, the previous set of candidate products from the partial product space may be retrieved and presented on GUI 200. In some embodiments, the sequence of the candidate products in the partial product space is based on their respective rankings. Typically, the most highly ranked candidate products will be presented initially on GUI 200, and the rest of candidate products may be shown if the user engages action 250.

In one embodiment, after exhausting the partial product space, action 250 may display a label or message indicating "not found," "none of the above," or similar. In another embodiment, if the rank of a candidate product being displayed drops below a threshold, action 250 may also display a similar label or message. In this case, if action 250 is engaged, the system may start to communicate with a power user, such as a system administrator, a store manager, or an attending clerk, or the like, so that the power user may intervene, e.g., help customers identify the correct product.

In various embodiments, action 260 is another control element configured to perform a transaction. In one example, action 260 displays a label or message (e.g., "Confirm," "Add," "Buy," "Purchase," or similar) indicating confirming the selected candidate view and adding the selected product candidate to a transaction. Sometimes, upon invoking action 260, GUI 200 may be updated to collect additional information, such as the quantity of the unlabeled product, or additional services, such as packaging the unlabeled product. To add the unlabeled product to the transaction, various product attributes may be considered, such as the selected class of product, the quantity of the product, the unit price of the product, etc., so that the final price of the unlabeled product may be determined.

In some embodiments, action 260 may invoke a product verification process, especially if a relatively low ranked item in the partial product space has been selected, which will be further discussed in connection with FIG. 7. The product verification process will verify whether the unlabeled product matches the product class represented by the selected candidate view on GUI 200 based on, such as, size dissimilarity, visual dissimilarity, weight dissimilarity, etc. The product verification process can prevent human errors or fraud.

Although the user interaction is discussed as interacting with a touchscreen, the inventors have contemplated that a user may also interact with GUI 200 via voice interaction, gesture interaction, etc., besides pressing the touchscreen or performing a mouse action. By way of example, a user may utter a speech command to select a product candidate, such as "select the first candidate" or "select product TWO" if the product candidates are numbered.

In one embodiment, a user may express audibly for the user selection based on the candidate description. To invoke the voice interaction, users may engage action 260, which may be labeled as "Voice Selection" before any candidate product was selected. As an example, candidate description 232 may show "Cavendish Bananas," among other information, while candidate description 242 may show "Lady's Finger Bananas," among other information. Accordingly, a user may dictate "Cavendish Bananas" or "Lady's Finger Bananas" to select a particular product class.

In this case, candidate description 232 and candidate description 242 are also serving as prompts for voice interaction. In some embodiments, the valid vocabulary may be limited to the prompted product names on GUI 200. In other embodiments, the valid vocabulary may be limited to the product candidates in the partial product space. In all these embodiments, due to the limited vocabulary and the prompts, the system is highly accurate and efficient in determining the voice selection compared to if the full product space is used.

FIG. 3 is a schematic representation illustrating another exemplary GUI for product recognition, which is designated generally for small screens, such as smartphone 300, as illustrated. In this embodiment, the user may use smartphone 300 to snap a picture of a product, labeled or unlabeled. Subsequently, an app, configured for recognizing unlabeled product, e.g., based on compressed network 158, will present the picture of the product at product view 310. After recognizing the product, the app can provide information of a highly ranked candidate product at candidate information 320, which may include one or more images and various attributes of the candidate product. Action 330, action 340, and action 350 are elements of interaction, similar to action 250 and action 260 in FIG. 2, which facilitate the user to directly interact with the app. Similarly, elements of interaction may have different modes and represented by different UI elements based on the context, which will be further discussed in view of different user cases.

In some embodiments, an image of the unlabeled product and an image of the candidate product are comparatively displayed at product view 310 and candidate information 320 respectively. In this way, the user can intuitively compare the unlabeled product with the candidate product and subsequently make a decision. In some embodiments, product view 310 may be removed from the GUI, so that candidate information 320 could take more space and present additional information, which may be more desirable for mobile devices with a smaller display. The inventors have contemplated that a mode of showing product view 310 and another mode of hiding product view 310 may be easily switched by a user via app configuration, a gesture (e.g., a swipe gesture), etc.

In one app based embodiment, a practical application of compressed network 158 is to enable transactions on the go. By way of example, in a fully self-guided store, a user can move to different parts of the store, choose a product, and snap a picture of the product. If the user confirms that product matches the candidate product shown at candidate information 320, the user can engage action 350 (e.g., in a "add to virtual cart" mode) to put the product into a virtual shopping cart. Otherwise, the user can engage action 330 and action 340 to browse back and forth of other highly ranked candidate products in the reduced partial product space until the correct product is shown at candidate information 320. In this practical application, user experience is dramatically improved. The user does not need to push a shopping cart, which can be difficult for those who are physically challenged. Further, the products in the virtual cart can be converted to an online order and can be delivered to the user's home, so that the user does not have to carry anything during shopping.

Alternatively, the user may place the product into a physical shopping cart or shopping bag, and engage action 350 (e.g., in a "add to physical cart" mode or "buy" mode) to complete the transaction for purchasing the product. In this embodiment, each product may be purchased individually in a separate transaction. Alternatively, all products that have been added to the physical cart may be purchased together in the end of the shopping session. Before committing the final purchase, if the user decided to remove a product from the physical cart, the reverse process may be performed. For example, action 350 may be adjusted to a "remove" mode. Once the user confirms that a match between product view 310 and candidate information 320, action 350 in the "remove" mode may allow the user to remove a product.

Advantageously, regardless whether the product is labeled, unlabeled, or mislabeled, these app based embodiments can still assist users to complete transactions because these transactions are based on the images of the product. Further, back to FIG. 3, when action 350 is under the "buy" mode, this app based embodiment also has a unique advantage of two-step purchasing. The candidate product shown on candidate information 320 will likely match the target product because the disclosed technology can accurately perform product recognition. In a sense, the "direct-recognition" technology disclosed herein, i.e., when the first presented candidate product matches the target product, has made two-step purchasing possible, in which a user only needs to take a picture of the target product, then engages action 350 to complete the transaction. Notably, assuming a registered user has a default payment method on file, a shipping address may not be required if the user does not need shipping, e.g., when shopping with a shopping cart or picking up from the store.

Although compressed network 158 may be deployed to a mobile device, in an alternative embodiment, the pictures taken by users may be sent back to computing device 112 on computing cloud 110 for product recognition. When the communication network is fast enough, users may not notice a significant difference when candidate products can be quickly loaded to candidate information 320. This alternative embodiment has the advantage to swiftly re-train and update the neural network for product recognition on the back end without impacting the users on the front end. Otherwise, as new products are being added to a store's inventory, compressed network 158 may be updated and re-deployed to mobile devices, e.g., when users update their apps.

In one embodiment, a universal version app is designed to perform product recognition for all products that are used to train the neural network. The trained neural network is more powerful, thus it is suitable to be used for general tasks, such as to recognize a random product in any stores. However, this neural network model may require substantial computational power to perform a product recognition task when the product space is huge. Typically, the neural network is not deployed to edge devices in this embodiment. Rather, the image of the unlabeled product is uploaded to a server for product recognition, and the result is returned to the user.

In another embodiment, a universal lite version app is designed to enable users to select a specific store, a specific product line, or a specific brand, etc., then a corresponding neural network is used for product recognition for the specific store. The corresponding neural network may be deployed to the user device to perform product recognition tasks locally, especially in view of a limited number of products in a single store. Alternatively, if the store has a great collection of different products, the product recognition tasks may be performed remotely, and the resulting candidate products may be sent to the user device.

The universal lite version app is suitable for a collection of stores, such as a shopping mall. When users travel from one store to another, the products may change dramatically. However, the corresponding neural network is specifically trained for specific stores, so that if the user selects a correct store, this universal lite version app will still remain reliable for product recognition tasks. The universal lite version app is also suitable when the user has a general concept of the product line. For example, when the user is browsing a sports section, a compressed neural network trained for recognizing sporting goods may be deployed to the user device. The universal lite version app is also suitable when the user shops for a particular brand. By way of example, a version of the neural network may be trained to recognize the difference between a genuine product and a counterfeit product or nuances between two products lines. In this case, if the user has selected a particular brand, the brand-specific neural network may help the user to identify a counterfeit product.

In yet another embodiment, a store specific version app is designed to enable users to concentrate in the products in a particular store or a chain of stores of a particular brand or franchise. A store refers to a specific venue with a collection of items. By way of example, stores include an exhibition at a museum, art gallery, park, library, exhibition hall, trade shows, etc., which may have a presentation of a selection of many items. Enabled by the disclosed technology, a store specific version app can recognize products in the specific store. By using the store specific version app, users can learn relevant information of a specific item by simply taking a picture of the item, e.g., via their handheld devices, and conduct transactions thereafter.

FIG. 4 is a schematic representation illustrating an exemplary training process, in accordance with at least one aspect of the technology described herein. In block 410, compressed network 404 is generated using at least two training stages. Training stage 420 is featured with attention based compression 422, and training stage 430 is featured with one or more compressed layers 432. Training data, such as data 402, may be used in both training stage 420 and training stage 430 for training compressed network 404 to recognize unlabeled products. Training stage 420 is further illustrated with more details in block 440, while training stage 430 is further illustrated with more details in block 470.

In block 440, the neural network is trained to identify unlabeled products, while training data 442 may comprise inaccurately-labelled image datasets. The neural network may be iteratively trained, via a weakly-supervised method with a learning curriculum, e.g., based on the sequence of the image subsets or the label associated with the training images.

More specifically, the training process may be designed to train the neural network to classify classes of products in a coarse-grained level, such as different classes of fruits or vegetables (e.g., apple, orange, banana, asparagus, cauliflower, celery, carrot, etc.), or a fine-grained level, such as different subclasses (e.g., different cultivars of bananas) based on the training data and specially configured convolutional layers to utilize different features of the training data.

In block 440, training data 442 is used to train the neural network with many layers, illustrated by input layer 444, convolutional layer 446, convolutional layer 452, convolutional layer 456, and output layer 448. As understood by a skilled artisan, more or less layers, compared with what's illustrated in FIG. 4 may be used in a neural network.

Attention module 454 is connected after convolutional layer 452. Similarly attention module 458 is connected after convolutional layer 456. Attention modules may also be understood as specially designed layers in some embodiments, in which an attention module is configured to identify a dispensable channel for channel reduction. Further details of an attention module is discussed in connection with FIG. 5.

Specifically, attention module 454 is configured to identify dispensable channels in convolutional layer 452, while attention module 458 is configured to identify dispensable channels in convolutional layer 456. In other words, the output from an attention module is used to identify dispensable channels for channel reduction. Based on the dispensable channels identified by these attention modules, compression 460 is a process configured to perform channel reduction, for convolutional layer 452 and convolutional layer 456 respectively. In this sense, the compression mechanism is based on the attention mechanism in attention modules. Resultantly, convolutional layer 452 becomes compressed convolutional layer 482 in block 470, while convolutional layer 456 turns into compressed convolutional layer 486.

In block 470, the neural network is trained again with training data 472. Accordingly, input layer 474, convolutional layer 476, convolutional layer 482, convolutional layer 486, and output layer 478 likely will be reconfigured during the second training stage, such as different weights, bias, loss functions, etc., may be determined for maximizing the neural network's accuracy. Accordingly, the resulting compressed network in block 470 is generated via two training stages, and at least one uncompressed layer in the first training stage is compressed to become a compressed layer in the second training stage, e.g., based on channel reduction. Further, the resulting compressed network in block 470 comprises at least a compressed layer connected to an uncompressed layer, such as compressed convolutional layer 482 connected to convolutional layer 476.

In this embodiment, the first several layers in block 440 are purposely inherited into block 470 without compression because lower level features recognized by the first several layers are significant for the neural network's accuracy. On the other hand, convolutional layers in the middle or later part of the neural network likely contain some dispensable channels, which are suitable for channel reduction without significantly impacting the neural network's accuracy, but can improve the processing speed or reduce the computing resource requirements, which is an improvement to the computing technology itself. Resultantly, the first compressed layer is typically connected after an uncompressed layer, such as compressed convolutional layer 482 being connected after convolutional layer 476 in this case.

FIG. 5 is a schematic representation illustrating an exemplary attention process, in accordance with at least one aspect of the technology described herein. At a high level, attention module 510 is configured to differentiate channels of a convolutional layer based on channel-wise correlation operations and spatial-wise correlation operations. In some embodiments, attention module 510 comprises channel correlation manager 512 for managing channel-wise correlation, spatial correlation manager 514 for managing spatial-wise correlation, and operation manager 516 for managing various operations related to identifying a dispensable channel, e.g., based on the information of channel-wise correlation and spatial-wise correlation presented in an output of a convolutional layer.

Attention module 520 is used to illustrate the attention process. Vector 522 is the output from the layer before attention module 520. The information on each channel forms a feature map, which encodes the presence or absence, and degree of presence of one or more learned features, such as various edges, shapes, textures, semantic features, etc. Vector 522 may be represented as a C×H×W vector, where C is the number of channels, and H×W is the feature map size, e.g., the area of the height multiplied by the width of an image patch. By way of example, for a color image with 3 channels and size of 224×224 as the original input, the output of a convolution layer may become 1024×7×7, which has 1024 channels and a feature map size of 7×7.

In this embodiment, operation 542 includes a reshape function, which transforms vector 522 to vector 524. Vector 524 is a two-dimensional feature vector, which may be represented as C×(HW). Operation 544 includes a reshape and transpose function, which transforms vector 522 to vector 526. Vector 526 is also a two-dimensional feature vector, which may be represented as (HW)×C. At this point, the C×H×W vector has been rearranged to two vectors, i.e., C×(HW) and (HW)×C respectively.

Vector 524 and vector 526 may be further transformed into vector 548 via operation 550 and operation 560. Operation 550 includes a correlation function, and operation 560 includes an activation function, such as a logistic activation function (e.g., softmax), a Tan h or hyperbolic tangent activation function, a rectified linear unit (ReLU) activation function, etc. The activation function in operation 560 is applied to the output of the correlation function in operation 550. The correlation function here involves matrix multiplication performed on the spatial dimensions, i.e., on (HW), thus this correlation function is a spatial-wise correlation. Resultantly, vector 548 becomes a square matrix (i.e., C×C) with a dimension size being equal to the count of channels.

Further, vector 548 and vector 524 may be further transformed into vector 530 via operation 570 and operation 546. Operation 570 includes another correlation function, and operation 546 includes a reshape function. The correlation function here involves matrix multiplication performed on the channel dimension, i.e., on C, thus this correlation function is a channel-wise correlation. Resultantly, vector 530 recovers to be a C×H×W vector, similar to vector 522. Noticeably, the unique structure of attention module 520 causes an input to the channel-wise correlation operation to be derived from an output of the spatial-wise correlation operation.

The unique structure of attention module 520 in this embodiment includes both spatial-wise correlation and channel-wise correlation. In various embodiments, spatial information in H×W or (HW) may contain various global or high-level features (e.g., semantic features), while channel information in C may contain various local or low-level features (e.g., structural features). By directing the attention to a unique combination of global and local features based on the unique structure of attention module 520, advantageously, importance of different channels may be revealed at vector 530.

FIG. 6 is a schematic representation illustrating an exemplary compression process, in accordance with at least one aspect of the technology described herein. At a high level, compression module 610 is configured to perform channel reduction, e.g., based on the respective importance of channels. In some embodiments, compression module 610 comprises channel evaluator 612 for evaluating the respective importance of channels, and channel reducer 614 for reducing dispensable channels. Further, channel evaluator 620 and channel reducer 650 are specific embodiments to illustrate the process for evaluating channels and reducing channels respectively.

In the context of computer vision, channels may be viewed as different routes in convolutional neural networks for conveying specific information from one layer to another. A convolution layer in a neural network acts like a feature-extractor over its previous layer, e.g., via one or more filters and an application of a linear transformation followed by a non-linearity such as sigmoid, tan h, or ReLU. Typically, every filter acts over all the channels in the previous layer to extract features. If the pervious layer has M channels and K filters are applied in the present layer, then the output of the convolution layer may have up to M×K channels, assuming without consolidating information from different channels. As one can imagine, the output channels can grow quickly in this way because different filters may be desirable for different layers, and multiple filters may be desirable in a single layer to capture different information, such as using one filter to detect lines and another filter to detect dots, or using one filter to detect shape and another filter to detect color, and so forth. Although more channels can convey more information in general, significant numbers of channels may demand significant computing resources.

As discussed in connection with FIG. 5, after applying attention to the layer before the attention module, the output from the attention module, by way of example, may contain a C×H×W feature vector or feature map. C indicates the channel number, and H×W is the feature map size for each channel. In channel evaluator 620, the output from the attention module is represented as vector 622, which is transformed into vector 624 based on operation 632. Operation 632 includes a channel sum function, which causes vector 624 to become a one-dimensional vector. In one embodiment, the channel sum function in operation 632 is to calculate a numerical average of the features for each channel. In general, a channel sum indicates the relative importance of the corresponding channel.

Vector 626 and vector 628 are examples with numerical values as channel sums to further illustrate the channel evaluation process. Vector 626 is an example of vector 624 with channel sums. Operation 636 includes a ranking or sorting function, which causes vector 626 to be transformed into vector 628, where its channels have been ordered based on their respective channel sums. In various embodiments, various sorting functions may be used in operation 636.

Channel reducer 650 further uses a threshold in connection with vector 628 to determine candidate channels for channel reduction. In some embodiments, a predetermined threshold is used, such as a particular value. By way of example, if 0.7 is used as the threshold, any channels with a channel sum less than 0.7 are subject to channel reduction. As another example, if a target of 50% channel reduction is set, then the channels with a channel sum ranked in the bottom half become subject to channel reduction. In some embodiments, a dynamic threshold may be determined, e.g., based on the characteristics of vector 628 and some rules. By way of example, a rule may be set based on the difference between two adjacent channels in vector 628. For instance, if the difference between two adjacent channels is greater than a certain percentage, then subsequent channels with lower ranks are subject to channel reduction. Other types of thresholds and methods of determining the threshold may also be used.

Channels with lower ranks generally contain less information or less important information than channels with higher ranks. In practice, the former channels are potentially dispensable, which means that without these channels, the neural network can still accomplish the designed task without significant compromise, such as maintaining a comparable accuracy. Accordingly, channel reducer 650 may reduce those channels with lower ranks, based on the threshold and respective channel sums. In some embodiments, channel reducer 650 may remove channels identified as dispensable. Resultantly, compressed layer 654 has less channels compared to uncompressed layer 652. In other words, a compressed layer has more channels before compression.

Channel reduction, e.g., by half size, will significantly decrease the computation cost (e.g., processing unit usage, memory usage, etc.). Accordingly, high throughput and fast deployment of the compressed network may be achieved. Further, such compressed network may be deployed to computing devices without limited computational resources.

Figure 7:
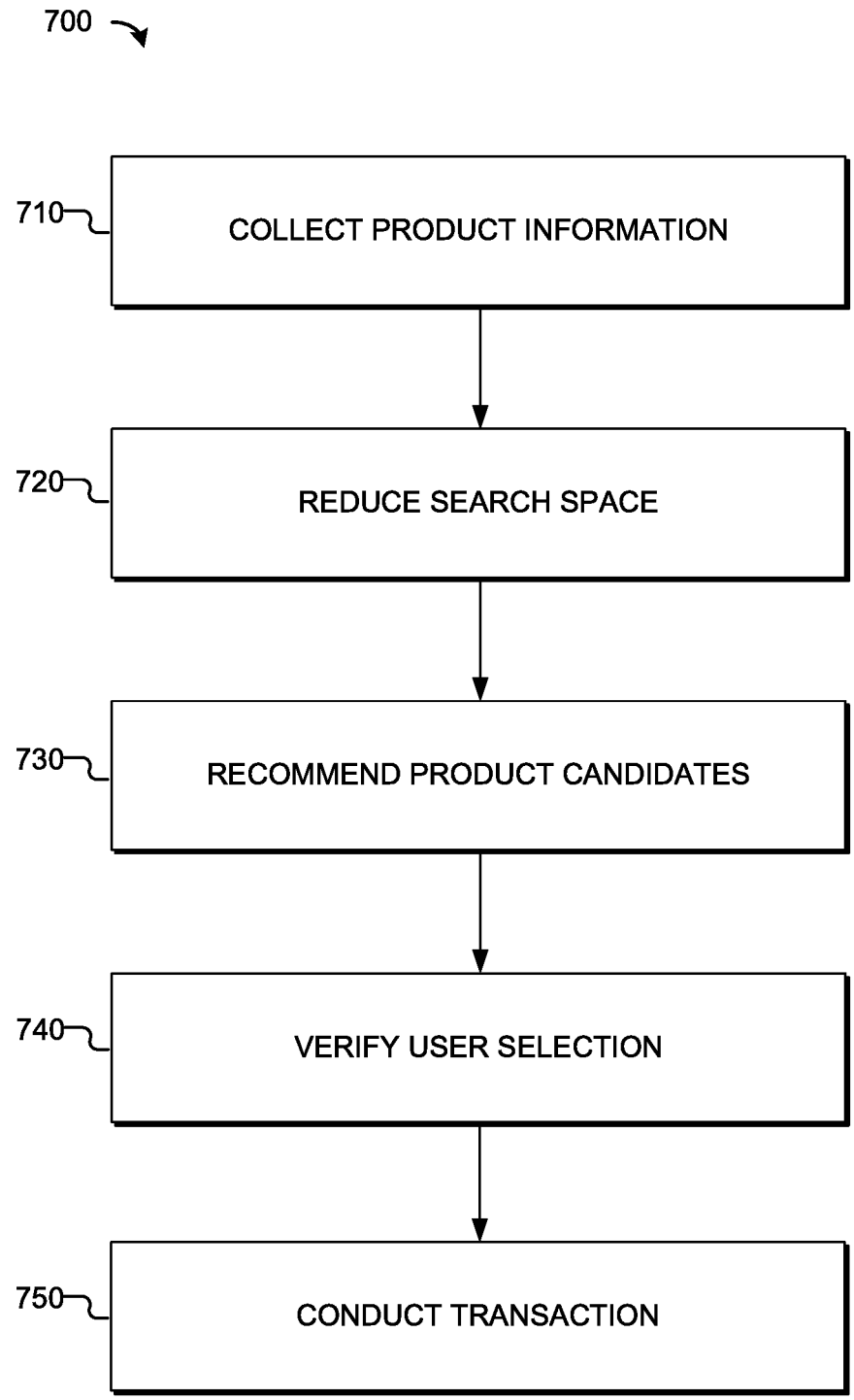
FIG. 7 is a flow diagram illustrating an exemplary process of recognizing unlabeled products for a transaction, in accordance with at least one aspect of the technology described herein.

Referring now to FIG. 7, a flow diagram is provided that illustrates an exemplary process of recognizing unlabeled products for an transaction. Each block of process 700, and other processes described herein, comprises a computing process that may be performed using any combination of hardware, firmware, or software. For instance, various functions may be carried out by a special computer or a processor executing special instructions stored in memory. The process may also be embodied as computer-usable instructions stored on computer storage media or device. The process may be provided by an application, a service, or in combination thereof At block 710, product information is collected, e.g., by computing device 150 of FIG. 1, smartphone 300 of FIG. 3, or other devices. Image data is one type of product information, which can be acquired via digital imaging. During the digital imaging process, using one or more imaging sensors, an imaging device can digitally encode the visual characteristics of a physical product, such as the shape, the color, etc. Other product information may be further derived from the image data. By way of example, the number of elements or units of the product objects may be automatically counted from the image, e.g., by automatically identifying object boundaries and counting the objects. In some embodiments, some types of product information may be input by a user, such as the count of the product associated with the image, or additional units not shown in the image, but desired by the user.

At block 720, a full product space is reduced to a partial product space to identify the product, e.g., based on compressed network 158 in FIG. 1. In some embodiments, the compressed network is configured to rank the classes in the full product space based on an image of the unlabeled product. By way of example, the compressed network may be used to determine respective relationship measures (e.g., a similarity measure) from the image of the product to every product class in the full product space. Accordingly, the product classes in the full product space may be ranked based on their respective relationship measures. Further, a threshold may be used to select highly ranked product classes to construct the partial product space. Resultantly, the partial product space is likely much smaller than the full product space. In this way, a limited number of product candidates in the partial product space may be presented for user selection.

In terms of the threshold for constructing the partial product space, either static or dynamic thresholds may be used in different embodiments. As an example, a static number N (e.g., 3, 10, 20, etc.) may be used, and the top N ranked product classes will be attributed into the partial product space. As another example, a static percentile P may be used, and the top P % ranked product classes will be attributed into the partial product space. As yet another example, a dynamic threshold may be determined, e.g., based on the characteristics of the specific distribution of the ranked product classes in the full product space. For instance, the threshold may be set to be a first product class in the ranked product classes that is significantly dissimilar from the target product in the image.

At block 730, product candidates in the partial product space are recommended to users for selection or confirmation. For example, one or more product candidates may be presented to users via GUI. In some embodiments, the system will cause a comparative display of an image of the unlabeled product and one or more images of product candidates in the partial product space, e.g., as illustrated in FIGS. 2-3. In this way, users can make better selections based on intuitive visual comparison.

At block 740, the user selection will be verified. In some embodiments, in response to a user selection of a product candidate, the system will verify whether the selected product candidate indeed matches with the unlabeled product, e.g., by comparing a size of the unlabeled product measured from the image and a known standard size of the selected product candidate. For example, the system can identify the unlabeled product in the image and determine a bounding box that encloses the unlabeled product. The size of the bounding box or the area within the bounding box in the image may then be compared with the known standard size of the selected product candidate. If the size corresponding to the bounding box does not match the standard size associated with the selected product candidate, the system may generate an alert for the potential mismatch. By way of example, orange and pomelo may share some visual resemblance, but differ significantly in size. If the unlabeled product is a pomelo and the user selected orange, the system will generate a mismatch alert based on the size dissimilarity. In other embodiments, other parameters, such as visual dissimilarity or weight dissimilarity, texture dissimilarity, etc. may also be used in this verification process.

In some embodiments, if a relatively high-ranked product candidate is selected, the system may skip the verification process or only use one measure, such as the size dissimilarity, for the verification. In some embodiments, if a relatively low-ranked product candidate is selected, the system will automatically engage the verification process, and may use multiple measures for the verification. In some embodiments, the price difference between the selected product candidate and the top ranked product candidate will trigger the verification process. For example, if the price difference is greater than a threshold, e.g., 20%, the verification process may be triggered, and meanwhile, an alert may be generated.

If a potential mismatch is detected, the system may temporally suspend the ongoing transaction and generate an alert for the potential mismatch. The alert may be shown to the user. The alert may be sent to a remote system (e.g., retail store employee's computer, manager's computer, etc.), so that a helper could be directed to address the issue.

At block 750, a transaction may be conducted, e.g., facilitated by the product recognition technologies disclosed herein. In a retail transaction context, the selected product candidate and related product information (e.g., the weight, the count, etc.) may be added to a transaction at this block. For example, in response to a user selection of a purchase action, the system may retrieve other product information, such as the weight or the count based on the nature of the product. Accordingly, one transaction may be conducted based on the weight and the selected product candidate, and another transaction may be conducted based on the count and the selected product candidate.

Figure 8:
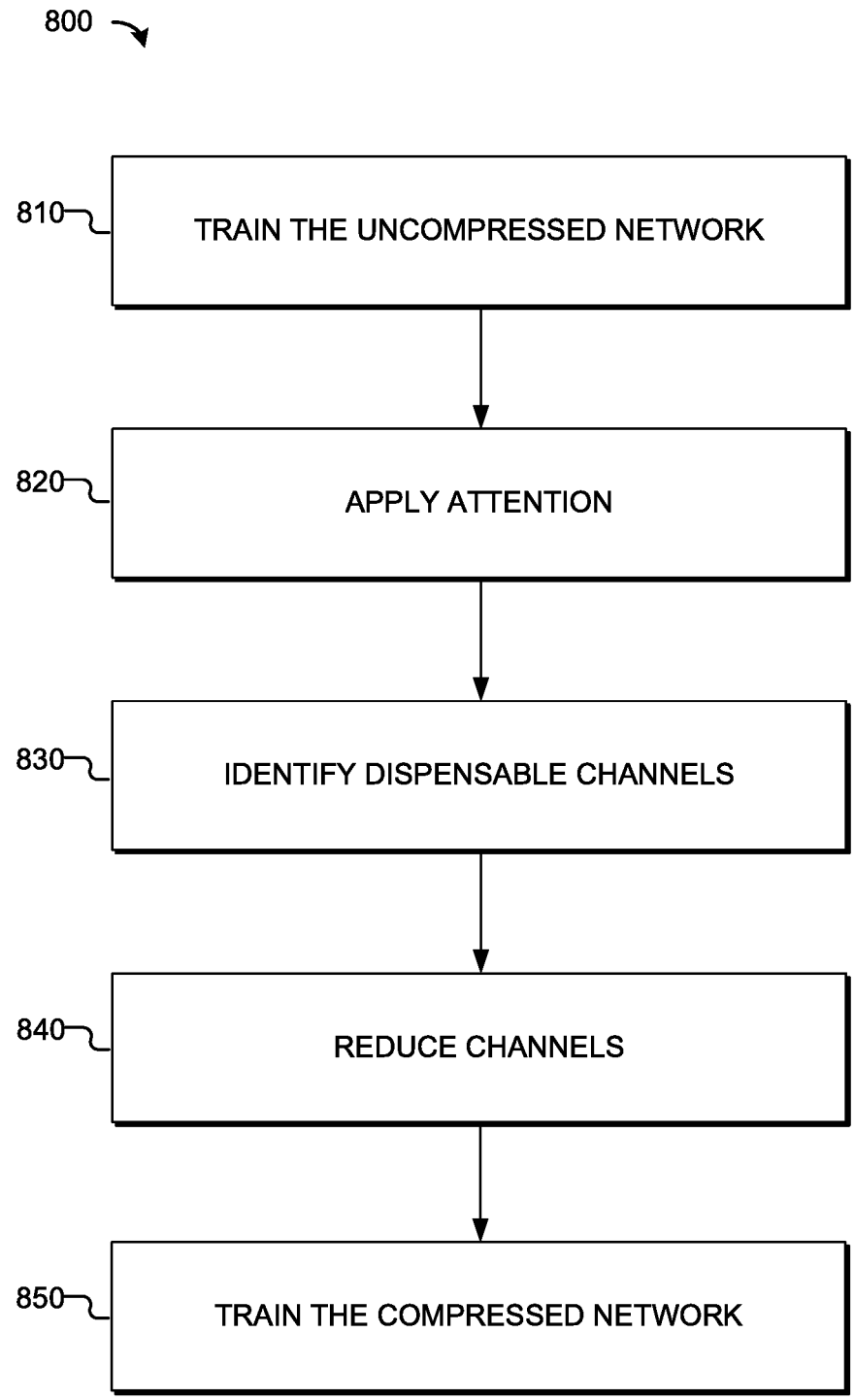
FIG. 8 is a flow diagram illustrating an exemplary process of training a neural network, in accordance with at least one aspect of the technology described herein.

Turning now to FIG. 8, a flow diagram is provided to illustrate an exemplary process of training a neural network to recognize unlabeled products. Process 800 can be understood in view of FIGS. 4-6. A compressed network is generated via two training stages, wherein an uncompressed layer in the first training stage is compressed to become a compressed layer in the second training stage, e.g., based on channel reduction. Accordingly, the compressed layer has less channels compared to its uncompressed counterpart.

Similar to FIG. 7, each block of process 800, and other processes described herein, comprises a computing process that may be performed using any combination of hardware, firmware, or software. Further, the process may be provided by an application, a service, or in combination thereof. In various embodiments, process 800 may be performed in relation to block 720 and block 730 of FIG. 7, in terms of training a neural network to recognize unlabeled products, so that the full product space may be reduced a partial product space, and highly ranked product candidates may be recommended for user selection.

At block 810, the uncompressed network is trained for recognizing unlabeled products, such as in training stage 420 in FIG. 4. In some embodiments, the uncompressed network is trained using a combination of weakly-supervised training, curriculum learning, attention, and compression techniques for unlabeled product recognition, e.g., by training engine 120 in FIG. 1.

At block 820, attention is applied, e.g., based on the process illustrated in FIG. 5. In some embodiments, the attention is based on a combination of a channel-wise correlation operation and a spatial-wise correlation operation.

At block 830, dispensable channels are identified, e.g., based on the process illustrated in FIG. 6, and by channel evaluator 620. In some embodiments, channel-sums of the feature map are used to indicate the relative importance of different channels. Accordingly, the channels with low channel-sums may be deemed as dispensable channels for the purpose of channel reduction.

At block 840, dispensable channels are reduced, e.g., based on the process illustrated in FIG. 6, and by channel reducer 650. In some embodiments, all channels below a threshold may be reduced, so that the network may be compressed. In some embodiments, a minimum number of channels will be preserved so that the compressed network can retain a comparable performance as the uncompressed network.

At block 850, the compressed network is trained again to further improve its performance, such as in training stage 430 in FIG. 4. As the network structure is altered to some extent after some channels are removed, the compressed network may be trained again for optimization. In this second stage of training, many training parameters may be adjusted, particularly the weights of the connections due to the compression. Further, the number of epochs, the number of iterations, the learning rate, the activation function, the loss function, etc. may also be re-learned in the second stage of training.

Accordingly, we have described various aspects of the technology for recognizing unlabeled products. It is understood that various features, sub-combinations, and modifications of the embodiments described herein are of utility and may be employed in other embodiments without reference to other features or sub-combinations. Moreover, the order and sequences of steps shown in the above example processes are not meant to limit the scope of the present disclosure in any way, and in fact, the steps may occur in a variety of different sequences within embodiments hereof. Such variations and combinations thereof are also contemplated to be within the scope of embodiments of this disclosure.

Figure 9:
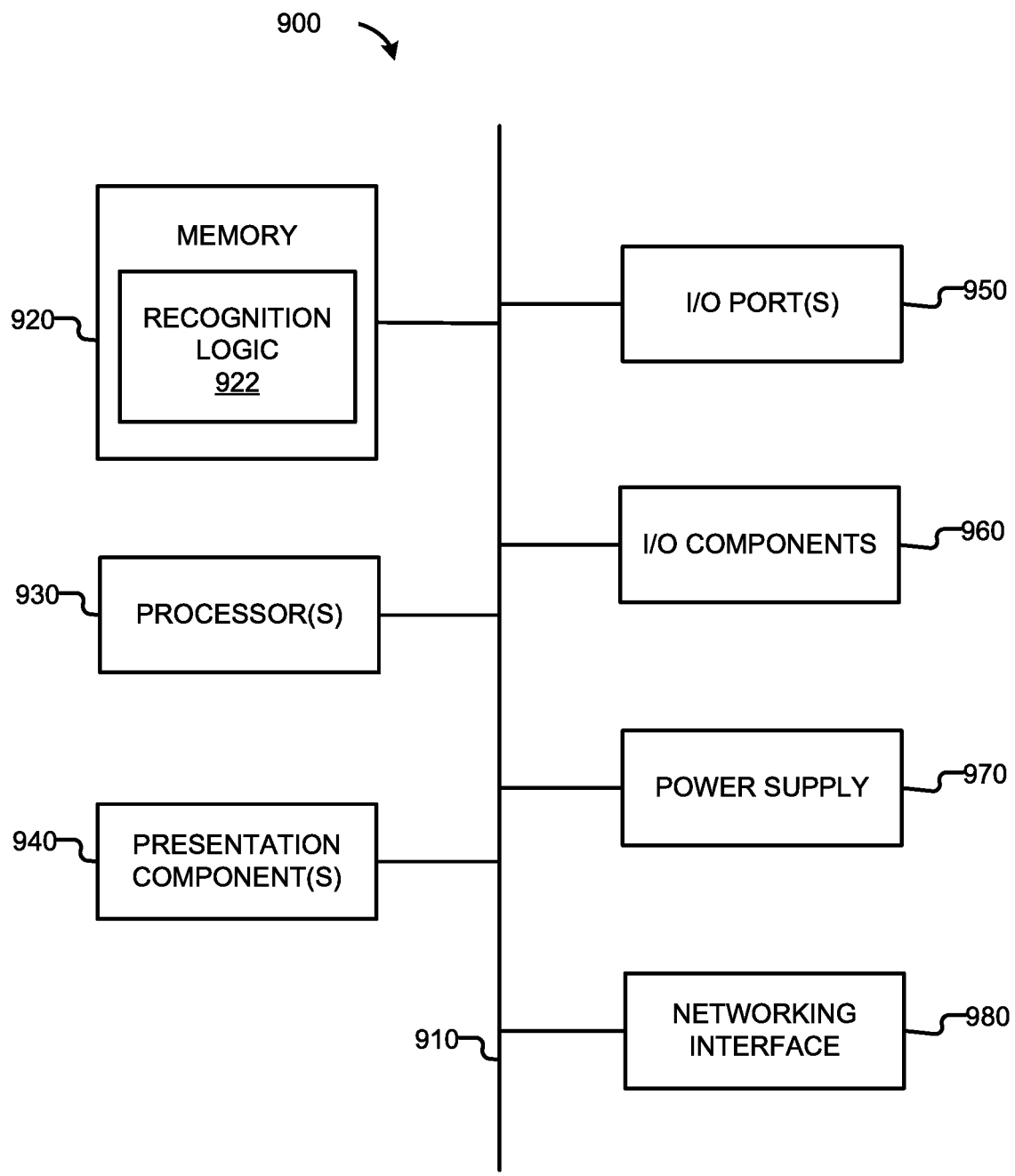
FIG. 9 is a block diagram of an exemplary computing environment suitable for use in implementing various aspects of the technology described herein.

Referring to FIG. 9, an exemplary computing environment for implementing aspects of the technology described herein is shown and designated generally as computing device 900. Computing device 900 is but one example of a suitable computing environment and is not intended to suggest any limitation as to the scope of use of the technology described herein. Neither should the computing device 900 be interpreted as having any dependency or requirement relating to any one or combination of components illustrated.

The technology described herein may be described in the general context of computer code or machine-useable instructions, including computer-executable instructions such as program components, being executed by a computer or other machine. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are connected through a communications network.

With continued reference to FIG. 9, computing device 900 includes a bus 910 that directly or indirectly couples the following devices: memory 920, processors 930, presentation components 940, input/output (I/O) ports 950, I/O components 960, and an illustrative power supply 970. Bus 910 may include an address bus, data bus, or a combination thereof. Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 9 is merely illustrative of an exemplary computing device that can be used in connection with different aspects of the technology described herein. Distinction is not made between such categories as "workstation," "server," "laptop," "handheld device," "Smartphones," "POS terminals," etc., as all are contemplated within the scope of FIG. 9 and refers to "computer" or "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer-readable media.

Memory 920 includes computer storage media in the form of volatile and/or nonvolatile memory. The memory 920 may be removable, non-removable, or a combination thereof. Exemplary memory includes solid-state memory, hard drives, optical-disc drives, etc. Computing device 900 includes processors 930 that read data from various entities such as bus 910, memory 920, or I/O components 960. Presentation component(s) 940 present data indications to a user or other device. Exemplary presentation components 940 include a display device, speaker, printing component, vibrating component, etc. I/O ports 950 allow computing device 900 to be logically coupled to other devices, including I/O components 960, some of which may be built in.

In various embodiments, memory 920 includes, in particular, temporal and persistent copies of recognition logic 922. Recognition logic 922 includes instructions that, when executed by processors 930, result in computing device 900 performing product recognition functions, such as, but not limited to, processes described in connection with FIGS. 1-8. In various embodiments, recognition logic 922 includes instructions that, when executed by processor(s) 930, result in computing device 900 performing various functions associated with, but not limited to, weakly-supervision module 122, curriculum learning module 124, attention module 126, compression module 128 in computing device 112, or compressed network 158 in computing device 150, in connection with FIG. 1.

In some embodiments, processors 930 may be packaged together with recognition logic 922. In some embodiments, processors 930 may be packaged together with recognition logic 922 to form a System in Package (SiP). In some embodiments, processors 930 can be integrated on the same die with recognition logic 922. In some embodiments, processors 930 can be integrated on the same die with recognition logic 922 to form a System on Chip (SoC).

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 930 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

I/O components 960 include a graphical user interface, which allows users to interact with computing device 900 through graphical icons and visual indicators, such as various icons illustrated in FIGS. 2-3. Interactions with a GUI usually are performed through direct manipulation of the graphical elements in the GUI. Generally, such user interactions may invoke the business logic associated with respective graphical elements in the GUI. Two similar graphical elements may be associated with different functions, while two different graphical elements may be associated with similar functions. Further, a same GUI may have different presentations on different computing devices, such as based on the different graphical processing units (GPUs) or the various characteristics of the display.

Computing device 900 may include networking interface 980. The networking interface 980 includes a network interface controller (NIC) that transmits and receives data. The networking interface 980 may use wired technologies (e.g., coaxial cable, twisted pair, optical fiber, etc.) or wireless technologies (e.g., terrestrial microwave, communications satellites, cellular, radio and spread spectrum technologies, etc.). Particularly, the networking interface 980 may include a wireless terminal adapted to receive communications and media over various wireless networks. Computing device 900 may communicate with other devices via the networking interface 980 using radio communication technologies. The radio communications may be a short-range connection, a long-range connection, or a combination of both a short-range and a long-range wireless telecommunications connection. A short-range connection may include a Wi-Fi® connection to a device (e.g., mobile hotspot) that provides access to a wireless communications network, such as a wireless local area network (WLAN) connection using the 802.11 protocol. A Bluetooth connection to another computing device is a second example of a short-range connection. A long-range connection may include a connection using various wireless networks, including 1G, 2G, 3G, 4G, 5G, etc., or based on various standards or protocols, including General Packet Radio Service (GPRS), Enhanced Data rates for GSM Evolution (EDGE), Global System for Mobiles (GSM), Code Division Multiple Access (CDMA), Time Division Multiple Access (TDMA), Long-Term Evolution (LTE), 802.16 standards, etc.

The technology described herein has been described in relation to particular aspects, which are intended in all respects to be illustrative rather than restrictive. While the technology described herein is susceptible to various modifications and alternative constructions, certain illustrated aspects thereof are shown in the drawings and have been described above in detail. It should be understood, however, that there is no intention to limit the technology described herein to the specific forms disclosed, but on the contrary, the intention is to cover all modifications, alternative constructions, and equivalents falling within the spirit and scope of the technology described herein.

What is claimed is:

1. An apparatus for product recognition, comprising:
   a touchscreen to display a user interface; and
   a compressed network, operatively connected to the touchscreen, configured to reduce a full product space to a partial product space, and rank a plurality of product classes in the partial product space based on an image of a product, thereby causing the user interface to present a representation of a product class of the plurality of product classes in the partial product space,
   wherein the compressed network comprises a compressed layer that is compressed based on an attention module applied to an uncompressed layer during a training stage of the compressed network, the attention module and the uncompressed layer being replaced by the compressed layer after the training stage of the compressed network,
   wherein the attention module generates, based on a channel-wise correlation operation and a spatial-wise correlation operation, a multi-dimensional attention vector to differentiate channels of the uncompressed layer for compression,
   wherein the compressed layer has at least one channel less compared to the uncompressed layer, the at least one channel being reduced based on a channel sum at a corresponding channel of the multi-dimensional attention vector, the multi-dimensional attention vector having same dimensionalities as an output of the uncompressed layer.

2. The apparatus of claim 1, wherein the compressed network comprises another compressed layer connected to another uncompressed layer.

3. The apparatus of claim 1, wherein the channel-wise correlation operation comprises a first matrix operation performed on a channel-related dimension, and the spatial-wise correlation operation comprises a second matrix operation performed on a feature-map-related dimension.

4. The apparatus of claim 1, wherein the compressed network comprises another attention module being configured to differentiate channels of another layer of the compressed network based on a combination of semantic features and structural features of the another layer.

5. The apparatus of claim 4, wherein a first input to the channel-wise correlation operation is derived from an output of the spatial-wise correlation operation, and a second input to the channel-wise correlation operation is derived from the output of the uncompressed layer.

6. The apparatus of claim 4, wherein an input to the channel-wise correlation operation comprises a square matrix with a dimension size being equal to a count of channels of the uncompressed layer, wherein the square matrix is generated by applying an activation function to an output of the spatial-wise correlation operation.

7. The apparatus of claim 1, wherein the compressed layer has at least one more channel before compression.

8. A computer-implemented method for product recognition, comprising:
   based on a first image of a product and a compressed network, reducing a full product space to a partial product space to identify the product, wherein the compressed network comprises a compressed layer;
   replacing an uncompressed layer and an attention module with the compressed layer after a training stage of the compressed network, wherein the replacing comprises generating a multi-dimensional attention vector based on a channel-wise correlation operation and a spatial-wise correlation operation in the attention module, and reducing at least one channel of the uncompressed layer based on a channel sum at a corresponding channel of the multi-dimensional attention vector; and
   causing a comparative display of a second image of the product and one or more representations of product candidates to a user interface, wherein at least one of the one or more representations of product candidates represents a ranked product class in the partial product space.

9. The method of claim 8, further comprising:
   receiving the first image of the product; and
   determining respective relationships from the first image of the product to a plurality of product classes in the full product space via the compressed network that has the compressed layer among a plurality of ordered layers.

10. The method of claim 9, further comprising:
    ranking the respective relationships from the first image to the plurality of product classes; and attributing a plurality of ranked product classes into the partial product space.

11. The method of claim 8, further comprising:
    in response to a user selection of an action on the user interface, retrieving a next set of product classes in the partial product space; and
    updating the user interface with respective representations of product candidates in the next set of product classes.

12. The method of claim 8, further comprising:
    in response to a user selection of a product candidate from the one or more representations of product candidates displayed on the user interface, verifying the product candidate being matched to the product based on a size of the product measured from the first image of the product.

13. The method of claim 8, further comprising:
    in response to a first user selection of an action on the user interface, retrieving a weight of the product; and
    generating a transaction based on the weight and a second user selection of a product candidate from the one or more representations of product candidates displayed on the user interface.

14. The method of claim 8, further comprising:
determining a count of units in the first image of the product; and
generating a transaction based on the count of units and a user selection of a product candidate from the one or more representations of product candidates displayed on the user interface.

15. One or more non-transitory computer storage devices comprising computer implemented product recognition instructions that, when used by one or more computing devices, cause the one or more computing devices to:
replacing an uncompressed layer and an attention module with a compressed layer after a training stage of a compressed network, wherein the replacing comprises generating a multi-dimensional attention vector based on a channel-wise correlation operation and a spatial-wise correlation operation in the attention module, and reducing at least one channel of the uncompressed layer based on a channel sum at a corresponding channel of the multi-dimensional attention vector;
based on a first image of a product and the compressed network, reduce a full product space to a partial product space to identify the product;
determine a ranked product class of a plurality of product classes in the partial product space; and
cause display of a representation of the ranked product class to a user interface.

16. The one or more computer storage devices of claim 15, the instructions further cause the one or more computing devices to:
generate the compressed network via two training stages, wherein a first layer in a first training stage is compressed to a second layer in a second training stage based on channel reduction.

17. The one or more computer storage devices of claim 16, the instructions further cause the one or more computing devices to:
identify a dispensable channel for channel reduction based on a channel-wise correlation and a spatial-wise correlation in an output of the first layer.

18. The one or more computer storage devices of claim 16, the instructions further cause the one or more computing devices to:
determine a numerical average of features for each channel; and
identify a dispensable channel for channel reduction according to the numerical average of features.

19. The one or more computer storage devices of claim 16, wherein the first layer is a convolutional layer, the instructions further cause the one or more computing devices to:
connect the attention module to the convolutional layer; and
identify a dispensable channel for channel reduction based on an output of the attention module.

20. The one or more computer storage devices of claim 19, the instructions further cause the one or more computing devices to:
compress the first layer to the second layer by removing the dispensable channel.

\* \* \* \* \*